United States Patent [19]

Vié

[11] 3,952,287

[45] Apr. 20, 1976

[54] DATA DETECTION SYSTEM

[75] Inventor: Christian Vié, St Cyr l'Ecole, France

[73] Assignee: Compagnie Industrielle des Telecommunications Cit-Alcatel, Paris, France

[22] Filed: Oct. 22, 1974

[21] Appl. No.: 517,286

[30] Foreign Application Priority Data

Oct. 22, 1973 France .............................. 73.37573

[52] U.S. Cl. ......................... 340/166 R; 340/147 G; 340/413; 179/18 FH

[51] Int. Cl.² ...................... H04Q 3/00; G08B 19/00

[58] Field of Search ......... 340/166 R, 147 G, 147 R

[56] References Cited

UNITED STATES PATENTS

| | | | |
|---|---|---|---|
| 3,311,883 | 3/1967 | Schmitz et al. | 340/147 G |
| 3,652,995 | 3/1972 | Amberg | 340/166 R |
| 3,678,459 | 7/1972 | Grolitzer et al. | 340/166 R |
| 3,828,314 | 8/1974 | Bradbery et al. | 340/166 R |

*Primary Examiner*—Donald J. Yusko
*Attorney, Agent, or Firm*—Sughrue, Rothwell, Mion, Zinn & Macpeak

[57] ABSTRACT

A system for detecting data such as telecommunication calls, alarm calls, fire calls in which the rapidity of the locating of data is obtained by a simultaneous detection at several levels is disclosed. It comprises a meshed network having several levels, a counter which locates the data at that level being related to each level, the counters progressing successively under the control of a supervising element and being blocked each in turn by that element when a data item is detected at the corresponding level. The invention is applicable, to great advantage, in telecommunications and alarm systems.

6 Claims, 3 Drawing Figures

DATA DETECTION SYSTEM

The invention concerns a system intended to detect and locate signals coming from a data network which may have great dimensions. It is applicable more particularly in telecommunications and in all branches of activity using data networks or call or alarm signalling, for example fire warning.

An object of the invention is to form a detection system having very rapid and very reliable operation even in a disturbed atmosphere.

In the detection system according to the invention, the increase in the rapidity of the locating of the data, in relation to known systems is obtained by a simultaneous detection on several levels. Each data item to be detected is given, for example, by means of a logic gate formed by semi-conductors, or by a switch or relay contact.

The data access cabling is wired up in the form of matrixes of such gates. The first detection level concerns the data contained in such a matrix.

Combining together several matrixes in groups, a second detection level is obtained. In this configuration, the outputs of a same matrix are multiply connected so as to have only one output per matrix sending out a data item if any one of the gates of the matrix is "conductive". The multiple connecting of matrixes limits the number of data items detected at that second level.

In the same way, it is possible to effect a detection on several groups in accordance with a third detection level. The number of detection levels which can be formed is not limited and depends on the size of the network to be monitored.

On the other hand, reliability of operation can be made very great even in very severe conditions by the use of integrated circuits using C/MOS techniques, which are not very sensitive to disturbances.

In the detection system according to the invention, access to data is provided by a meshed network having several levels in which the gates are organized in matrixes which are themselves organized in groups of matrixes so as to form any number of levels; a counter enabling the locating of the data at that level is related to each of those levels, the set of counters making it possible to locate completely the data in the network. These counters progress successively, under the control of a supervising element and are blocked each in turn by that element when a data item is detected at the corresponding level.

The system according to the invention may be formed in a very compact configuration and commercially valuable manufacturing price.

An example of embodiment of a detection system according to the invention is described hereinafter as illustrated by the accompanying figures.

Figure 1:
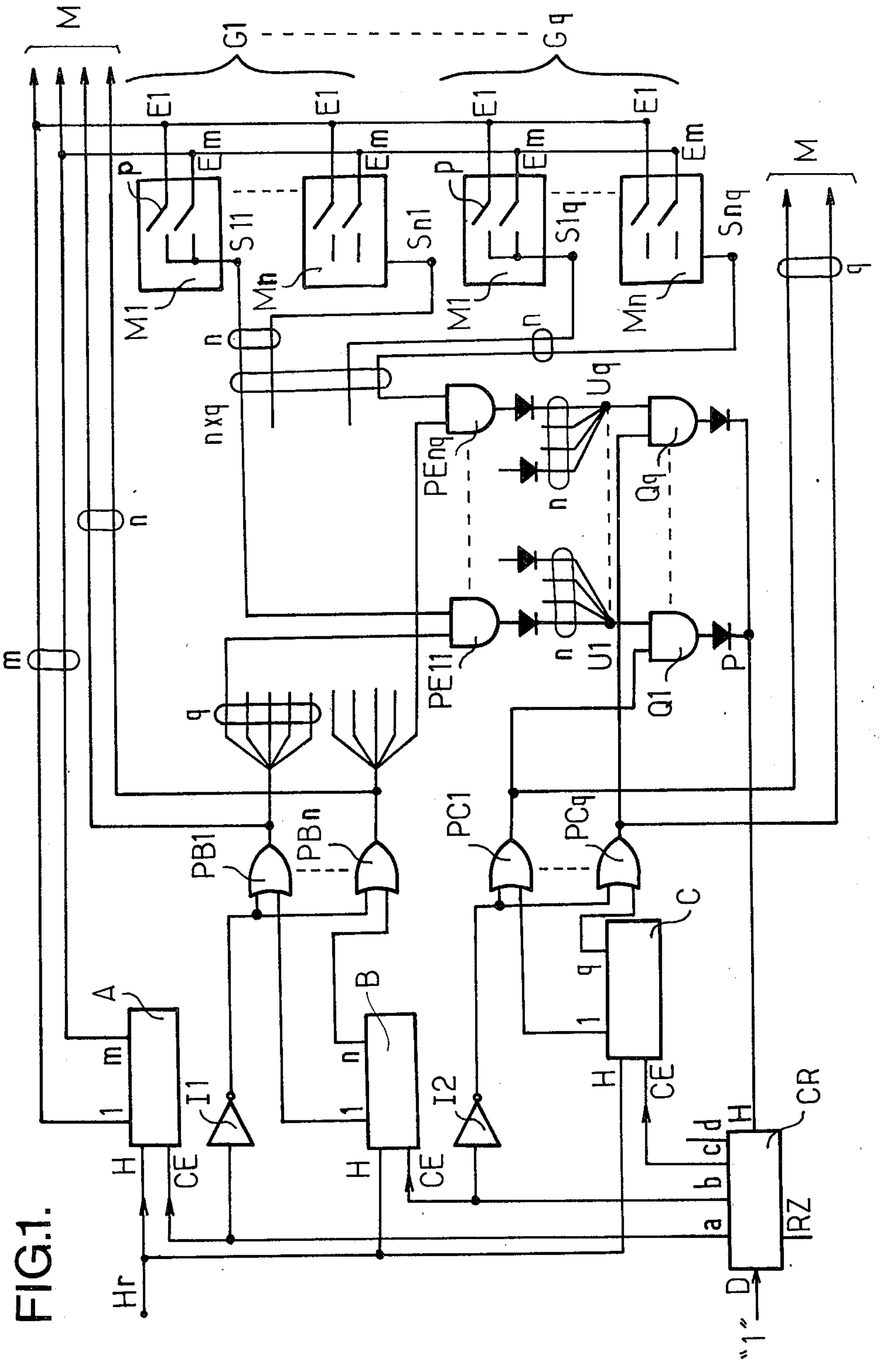
FIG. 1 is a circuit diagram of the set of matrixes receiving the data items and the detection system.

In the example shown in FIG. 1, the presence of a data item is revealed by the closing of a contact *p* suitable for that data item. The contacts *p* are grouped in matrixes Ml to Mn comprising a number *m* of contacts. Such a matrix Ml has *m* inputs El to Em each connected to a terminal of a contact *p*. The other terminals of these contacts are connected up as a common point to the single output Sll of the matrix.

These matrixes are combined in groups each containing a number *n* of matrixes. A total number *q* of groups Gl to Gq and hence a number $n \times q$ of matrixes is obtained. The matrixes Ml to Mn and their outputs Sll to Snq are referenced by two indices, the first showing the order of the matrix in its group and the second the number of the group.

The total number of data items detected and located by the system is $m \times n \times q$.

The inputs El to Em of the $n \times q$ matrixes are multiple connected between all the matrixes. That set of matrixes accordingly has m inputs El to Em and $n \times q$ outputs Sll to Snq.

The set of the contacts *p* is supervised by four electronic counters. One counter per detection level plus one general counter CR. In the form of the invention described here, all these counters are produced using the integrated circuit C/MOS technique. The three counters A, B, C used for detection typically may be modules CD 4017 A manufactured by R.C.A. The counter CR is typically module CD 4015 A manufactured by R.C.A.

The counters A, B, C are counters known as "step by step" counters comprising two inputs H, CE and a certain number of outputs. These outputs are in the state 0 except one which is in the state 1. The input H receives control pulses which make the counter progress, that is, one pulse makes the output which was in the state 1 change over to the state 0 and makes the following output change over to the state 1. After the last output, it is the first which changes over to the state 1. That control is possible only if the control input CE is in the state 0. A state 1 on CE blocks the counter.

The counter CR has four outputs *a*, *b*, *c*, *d* and operates by shifting: at each pulse applied to its input H, the data item applied to an input D (data) is displayed at the output *a* and the data items applied before the pulse at *a*, *b*, *c* pass respectively to *b*, *c*, *d*. In the example described, the input D is always in the state 1. Lastly, an input RZ for resetting to zero makes the outputs *a*, *b*, *c*, *d* change over to the state 0 when a pulse is sent to it.

The counter A effecting the detection at the level of a matrix comprises *m* outputs connected respectively to the inputs El to Em common to all the matrixes.

The counter B used for detecting at the level of the group of *n* matrixes has a number *n* of outputs connected respectively to one of the two inputs of *n* "OR" gates (PBl to PBn). The output of each of the "OR" gates is connected to the first input of a number *q* of "AND" gates PE having two inputs. A total of $n \times q$ "AND" gates is obtained and the second input of these gates is connected to the output S (Sll to Snq) of a matrix. Each gate is referenced with the same index as the output S which controls it (PEll to PEnq). The output of an "OR gate therefore controls an input of the *q* "AND" gates related to *q* matrixes having the same order in the different groups. The outputs of the $n \times q$ "AND" gates are connected each through a diode avoiding current returns, to one of the *q* points Ul to Uq: a number *n* of outputs of "AND" gates is therefore connected to the same point U (Ul to Uq); these are the outputs of the "AND" gates corresponding to the *n* matrixes of a same group.

The counter C, used for detection at the level of the groups has $q$ outputs each controlling one of the two inputs of one of the "OR" gates PCl to PCq. The outputs of these "OR" gates are each applied to an "AND" gate (Ql to Qq) having two inputs. The second input of each gate Ql to Qq is connected to the corresponding point Ul to Uq and the output of these gates are each connected through a diode to a common point P.

Figure 2:
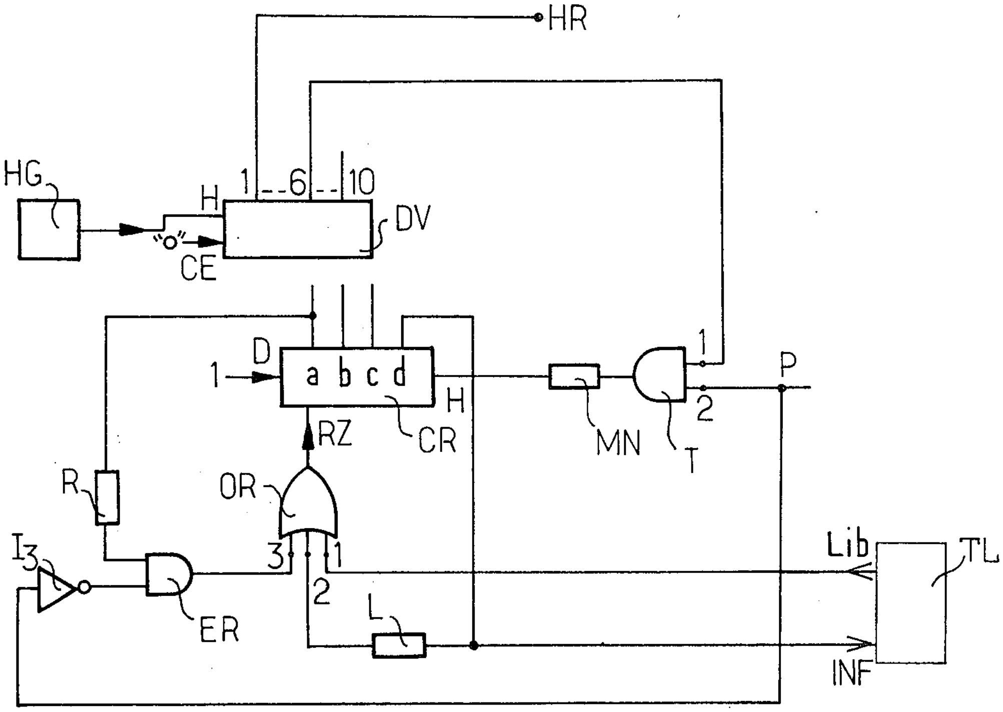
FIG. 2 illustrates the circuit used for the protection against parasites and wrong addressing.

The supervising counter CR has four outputs $a$, $b$, $c$, $d$:

The output $a$ is connected to the input CE of the counter A and to an inverter Il whose output is multiple connected to an input of the "OR" gates PBl to PBn;

The output $b$ controls the input CE if the counter B and an inverter I2 whose output is multiple connected to one of the inputs of the gates PCl to PCq;

The output $c$ is connected to the input CE of the counter C; the connection of the output $d$ is shown in FIG. 2;

The input H of the counter CR is controlled from the point P.

The control of the inputs H of the counters A, B, C is generated from a point Hr receiving pulses from a single electronic clock HG (FIG. 2).

Lastly, the reading of the state of the counters A, B, C is effected at the end of the detection in a memory M connected to the outputs of those three counters. The reading of that memory is controlled by a logic processing device started up at the appearance of a data item and sending a releasing order for the system when the memorizing is ended.

OPERATION OF THE SYSTEM

Initially, all the outputs of the counter CR are in the state 0 and hence the input CE of the counters A, B, C is also at state 0. The three counters A, B, C progress at each clock pulse, but due to the fact that the outputs of the inverters I1 and I2 are in the state 1, all the "OR" gates of the system have their outputs in the state 1 and the counters B and C are inoperative for detection.

When one of the outputs of the counter A, changing over from the state 0 to the state 1 finds one or several of the $m \times q$ contacts $p$ to which it is connected closed, the state 1 is sent through that or those contacts, to one or several "AND" gates whose other input is also in the state 1. That state 1 is therefore transmitted to one or several of the points Ul to Uq, then the other input of a flip-flop Ql to Qq being in the state 1, to the input of the counter CR. The counter progresses and its output $a$ assumes the state 1.

The counter A is then blocked (input CE in the state 1) and the inverter I1 having its output in the state 0, the outputs of the counter B become operative again with respect to the "AND" gates PEll to PEnq.

When an output of the counter B, changing over to the state 1, transmits that state to the input of one or several "AND" gates whose other input has already received that state 1 from the counter A, that state 1 again reaches the input of the counter CR whose output b changes over then to the state 1. The counter B is then blocked and the counter C is made operative by the change in states of the inverter I2.

When an output of the counter C, changing over to the state 1, is applied through a gate PC to one of the "AND" gates Ql to Qq whose second input is connected to a point Ul to Uq in the state 1, the counter CR again progresses and makes its output C change over to the state 1.

The counters A, B, C are then blocked and indicate the contact number $p$, the matrix number and the group number from which the data detected comes.

The maximum number of clock pulses necessary for detecting a data item is $m + n + q$, whereas with a conventional system, one pulse per possible position of the data, that is, a maximum of $m \times n \times q$ pulses is needed. The time saved is therefore considerable.

The device making it possible to protect the system against detection errors and addressing errors is shown in FIG. 2:

The clock pulse HG is not directly applied to the point Hr but is connected to the input H of a dividing counter DV having 10 outputs, similar to the counters A, B, C and whose input CE is kept in the state 0. That counter therefore rotates freely at each pulse received. The output 1 of DV is connected to the point Hr and the output 6 is connected to the input of an "AND" gate T to two inputs, the second input of which is controlled by the point P in FIG. 1. The output of the gate T is connected to the input of a monostable flip-flop MN, controlling the input H of the counter CR.

The "detected data" signal is sent through the wire INF to a logic processing device TL starting from the output $d$ of the counter CR. That device TL is conventional and the manufacturing thereof depends on the type of the memory M which it makes it possible to charge.

The input RZ for resetting to zero of CR is controlled by an "OR" gate OR having three inputs. The input 1 of OR is connected up to the processing device TL by a wire Lib receiving the state 1 when the memorizing is ended. The input 2 is connected to the output $d$ of CR through a delay circuit L, this making it possible to release the system in the case of error due to the logic treatment.

Lastly, the input 3 of OR is controlled by an "AND" gate (ER) whose two inputs are connected, the one to the inverter I3 connected to the point P, the other to the output $a$ of CR through a delay circuit R.

Figure 3:
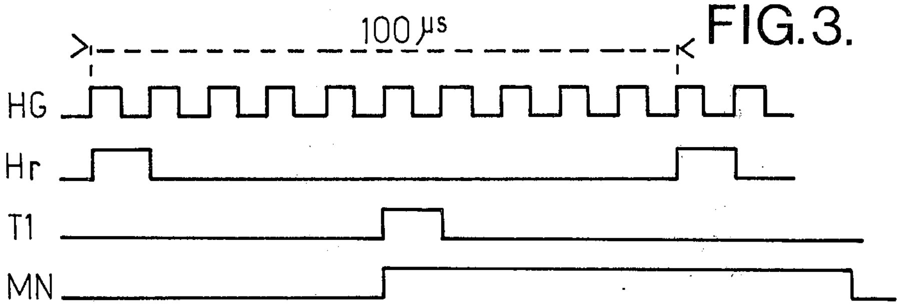
FIG. 3 is a timing diagram of the logic states at four points of the system.

That protection device acts in the following conditions:

The controlling of the point H of CR is possible only during a very short time, situated between two control pulses of the counters A, B, C at the point Hr, this allowing the passing of the data. Moreover, the duration of the pulse of the monostable element is less than 10 clock pulses. Thus, even in the case where a true data item and interference have been received, just at the moment of the permission signal, the counter CR could not progress by more than one step between two successive control pulses of A, B, C. FIG. 3 shows the present states at the output of the clock HG at the point Hr (output 1 of DV), at the input 1 of the gate T (output 6 of DV) and at the output of the monostable flip-flop MN. The latter tilts on receiving the pulse 6 and keeps its state for less than 10 pulses.

In the case where there has been no detection, but progression of CR due to an interference pulse, the point P remains in the state 0 and the output a of CR changes over to the state 1. When the delay of the circuit R has passed (delay greater than the sum of the operation periods of the counters B and C), the gates ER and OR are open and the counter CR is reset to zero.

The data will be recorded by the logic processing device only if it is stable, for it is the output *d* of OR which marks the wire INF.

The device which has just been described shows only one embodiment of the invention. Equivalent technical solutions may be used according to the nature and the number of data items to be detected and located.

I claim:

1. In a data detection system to detect and locate one data item among a number of data items, the presence of each data item being revealed by the change in logic states of an access gate, the improvement characterized in that the detection and location of these data items is achieved by means forming a meshed network (Ml to Mn) having several levels in which a plurality of access gates (*p*) are organized in matrixes (Ml to Mn) which are in turn organized in higher groups of matrixes (G1 to G9) so as to form any number of levels, a set of counters (A, B, C) related to each of these levels to scan said access gates and thereby locate the data item at that level, and supervising element means (CR) for successively controlling the action of the counters, said counters blocked each in turn by said supervising element when a data item is detected at the corresponding level.

2. The detection system according to claim 1, wherein said means forming a meshed network comprises levels at least three in number, these levels determining respectively the order of the access gate in the matrix, the position of the matrix in its group and the number of that group and wherein the matrixes have as many inputs as access gates and a single output (Sll), common to all the access gates of the matrix.

3. The detection system according to claim 1, wherein said supervising element is a shift counter (CR) whose outputs each control the blocking of a counter, except the last output of the shift counter, which is used for indicating that a data item has been completely located.

4. The detection system according to claim 1, wherein said set of counters comprises:

A first counter (A) for scanning at the first level comprising a number of outputs equal to the number of access gates per matrix, each of these outputs being connected to the input of the same order of all the matrixes;

A first set of "AND" gates having two inputs (PE), equal in number to the matrixes, one input of each of these gates being connected to the output of a matrix;

A second set of "AND" gates having two inputs (Q) equal in number to the number of higher groups, one input of each of these gates being controlled by the outputs of all the "AND" gates (PE) related to the matrixes of a same group;

A second counter (B), with as many outputs as matrixes in a group, each of these outputs being applied to an "OR" gate (PB) and the output of each "OR" gate being connected to the second input of all the "AND" gates (PE) related to the matrixes of the same order in the different groups;

A third counter (C) comprising one output per group of matrixes, each output of which is applied through an "OR" gate (PC) to the second input of the "AND" gate (Q) of the same order, the outputs of all the "AND" gates (Q) being connected to a common point (P) from which the supervising element (CR) is controlled;

An inverter (I1) controlled by the first output of the supervising element (CR) and being applied to the input of all the "OR" gates (PB); and An inverter (I2) controlled by the second output of the supervising element (CR) and being applied to the inputs of all the "OR" gates (PC).

5. The detection system according to claim 1, in which the outputs of the counters (A, B, C) are connected to a logic treatment element (TL), registering the position of said counters wherein said logic treatment element is started from the last output of the supervising element (CR) and means for protection against addressing errors or detection errors.

6. The detection system according to claim 5, wherein said protection means include a clock pulse (HG) that controls the progression of a step-by-step counter (DV) whose first output is connected to the input of the counters (A, B, C), the progression of the supervising element (CR) being controlled by a monostable multivibrator (MN), to which an "AND" gate (T) one of whose inputs is connected to the common point (P) and whose other input is connected to the middle output of said step-by-step counter (DV), wherein the controlling of the supervising element (CR) is possible only once during the time between two successive control pulses of the counters (A, B AND C) and that the resetting to zero of the supervising element (CR) is controlled through an "OR" gate (OR), from three points, a normal release control pulse coming from the logic processing element (TL);

a control pulse coming from the last output of the supervising element (CR) through a delay line (L) replacing the control pulse of the logic processing element (TL) if that element does not reply;

a control pulse acting with a delay greater than the normal shifting time of the supervising element (CR) from the first output until the last, when the blocking of the first counter (A) from the first output of the supervising element (CR) and the absence of the data at the common point (P) are obtained simultaneously.

* * * * *